(12) United States Patent
Kim et al.

(10) Patent No.: US 8,089,219 B2
(45) Date of Patent: Jan. 3, 2012

(54) SWITCHING MODE POWER SUPPLY FOR PLASMA DISPLAY PANEL

(75) Inventors: Jong Hae Kim, Gyeonggi-do (KR); Jong Sun Kim, Gyeonggi-do (KR); Dong Seong Oh, Incheon (KR); Don Sik Kim, Gyeonggi-do (KR); Jae Sun Won, Gyeonggi-do (KR); Jin Wok Kim, Seoul (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 777 days.

(21) Appl. No.: 12/147,772

(22) Filed: Jun. 27, 2008

(65) Prior Publication Data

US 2009/0322257 A1 Dec. 31, 2009

(51) Int. Cl.
*H05B 37/02* (2006.01)

(52) U.S. Cl. ............... 315/299; 315/209 R; 315/291; 315/111.21

(58) Field of Classification Search .......... 315/177, 315/186, 189, 192, 193, 200 R, 201, 205, 315/209 R, 210, 212, 214, 219, 220, 222, 315/224, 226, 247, 250, 254, 255, 257, 265, 315/266, 276, 277, 278, 279, 282, 287, 291, 315/299–302, 307, 308, 312, 313, 320, 326
See application file for complete search history.

(56) References Cited

U.S. PATENT DOCUMENTS 5,936,853 A * 8/1999 Mweene .................... 363/44

FOREIGN PATENT DOCUMENTS

| JP | 2005-033944 A | 2/2005 |
| JP | 2005-045918 A | 2/2005 |
| JP | 2005-229686 A | 8/2005 |
| KR | 100510143 B1 | 8/2005 |

OTHER PUBLICATIONS

Korean Patent Office, Notice of Allowance issued Oct. 22, 2008.

* cited by examiner

*Primary Examiner* — Douglas W Owens
*Assistant Examiner* — Jianzi Chen
(74) *Attorney, Agent, or Firm* — Lowe, Hauptman, Ham & Berner, LLP

(57) ABSTRACT

In accordance with the present invention, the SMPS circuit for PDP includes first and second transformers inducing voltages supplied to primary sides to secondary sides; a plurality of DC/DC converters connected to secondary sides of the first and second transformers and supplying voltages of different sizes; a clamp circuit connected to the secondary side of the first transformer and outputting an address voltage of a predetermined size by receiving a voltage supplied from the first transformer; and a linear regulator unit connected to the DC/DC converter for supplying a low voltage among the DC/DC converters connected to the secondary side of the first transformer and outputting a gate voltage of a predetermined size by receiving the low voltage supplied from the DC/DC converter.

19 Claims, 12 Drawing Sheets

[FIG. 1]
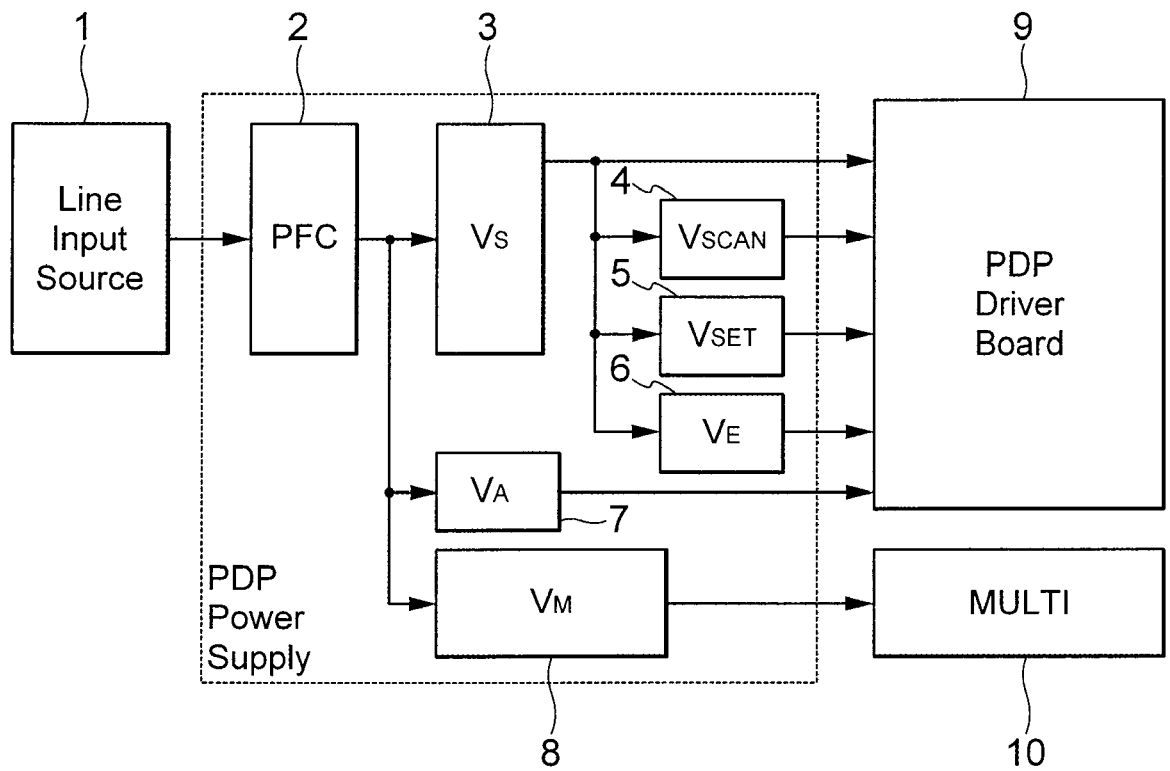
- Prior Art -

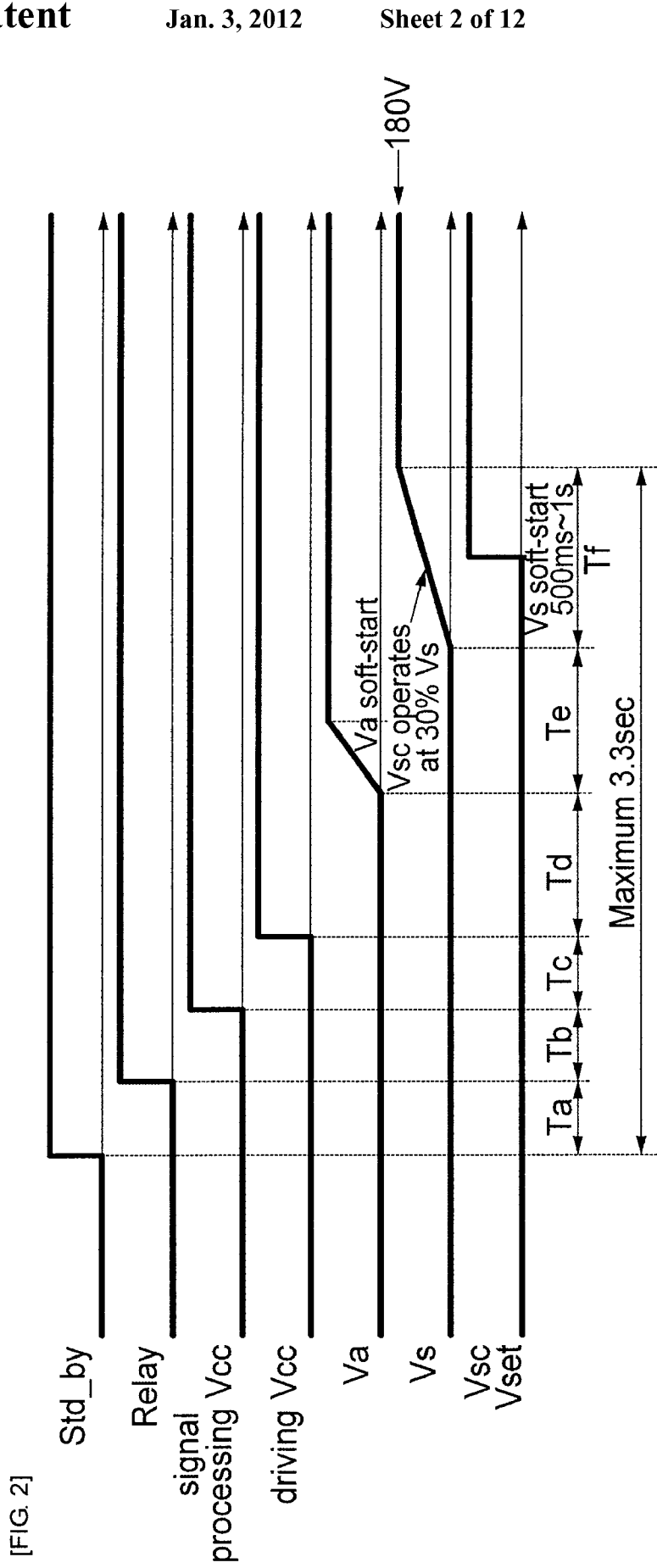
[FIG. 2] - Prior Art -

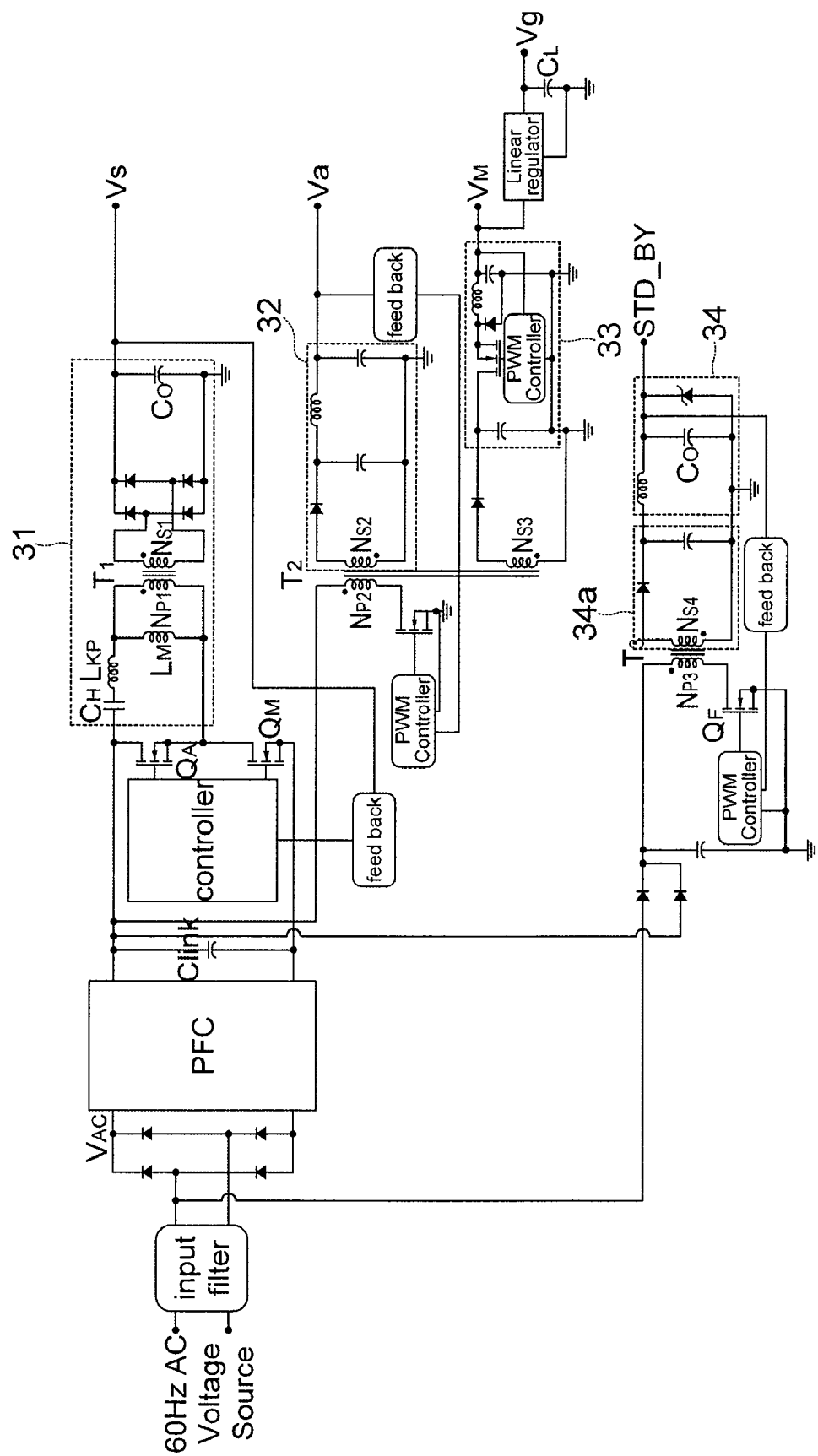
[FIG. 3]
- Prior Art -

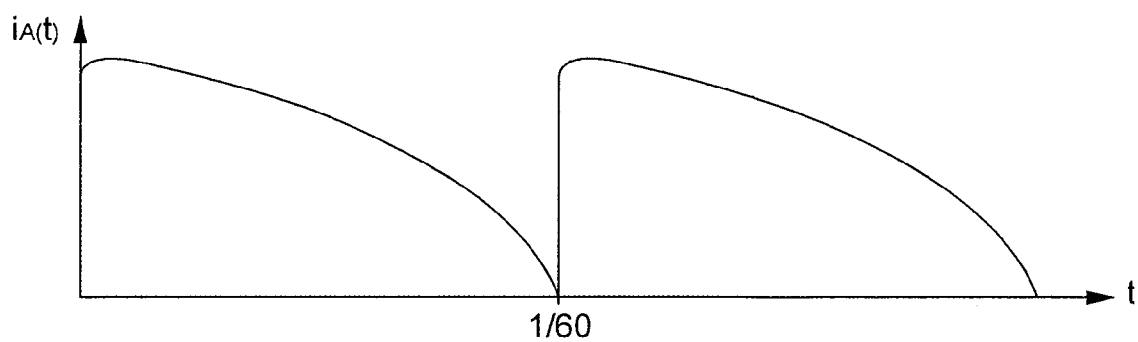
[FIG. 4A]
- Prior Art -
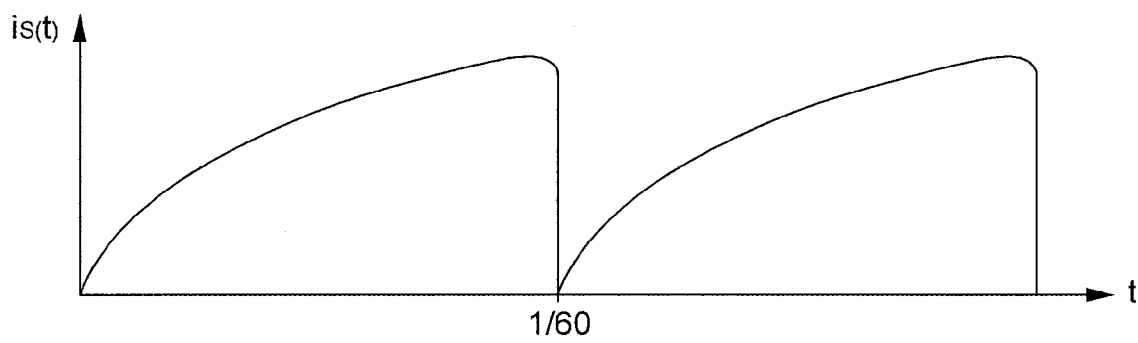
[FIG. 4B]
- Prior Art -

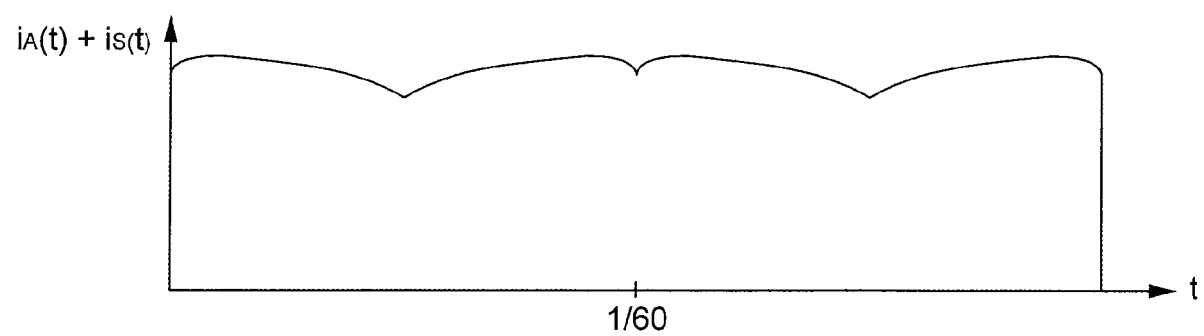
[FIG. 4C]
- Prior Art -

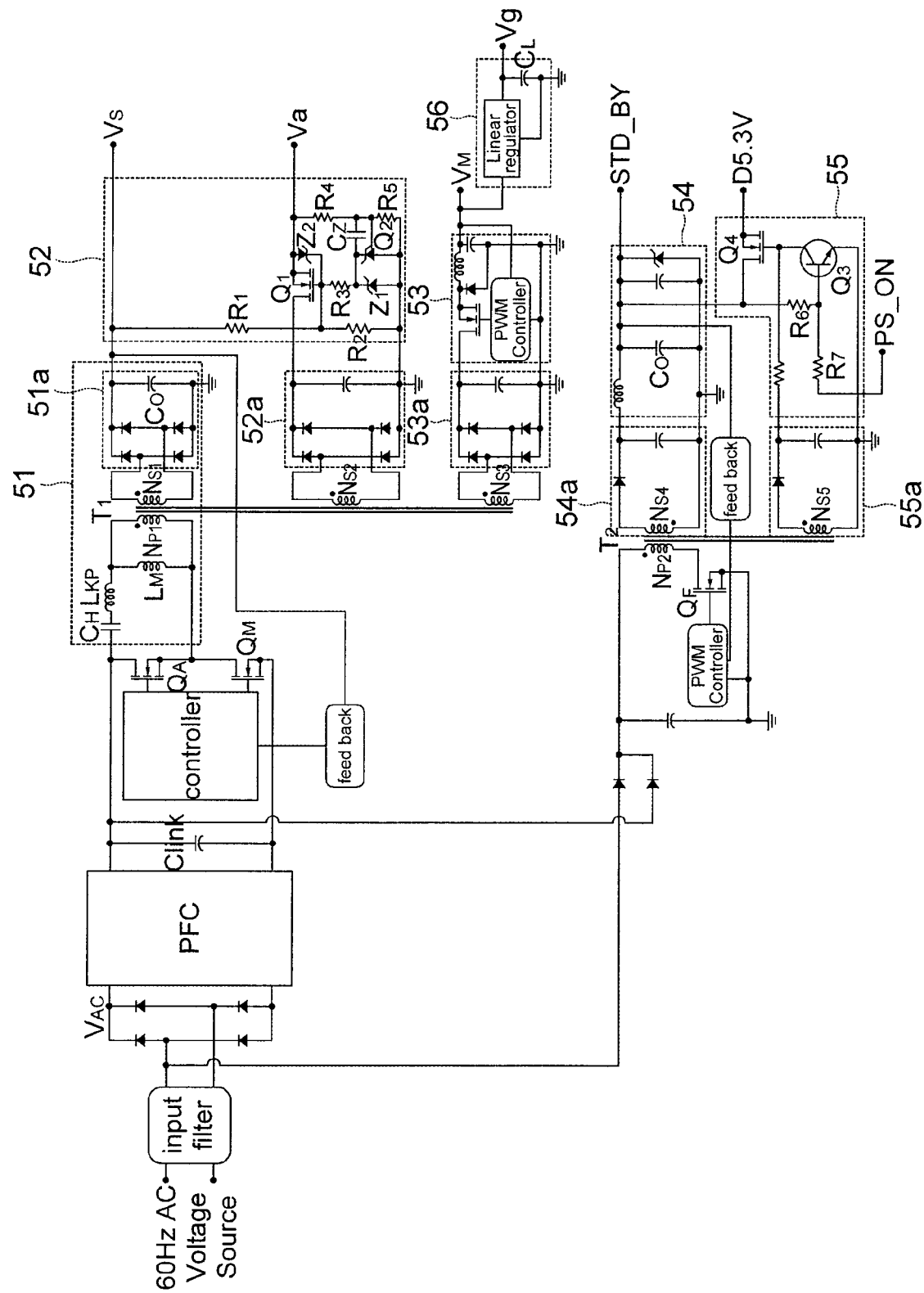
[FIG. 5]

[FIG. 6]
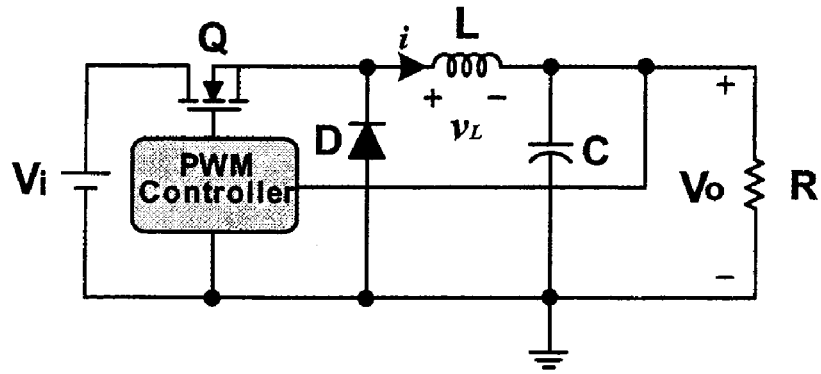
[FIG. 7A]
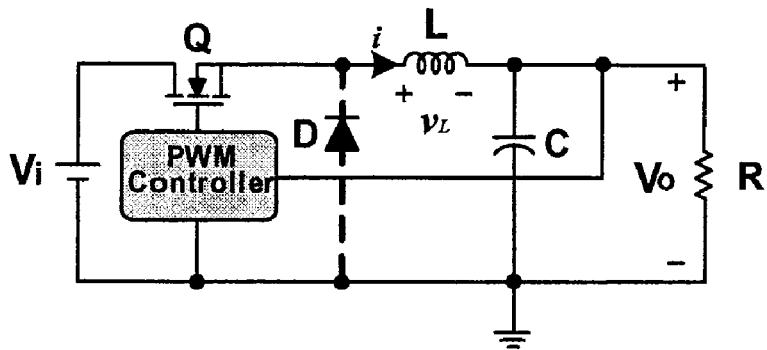
[FIG. 7B]
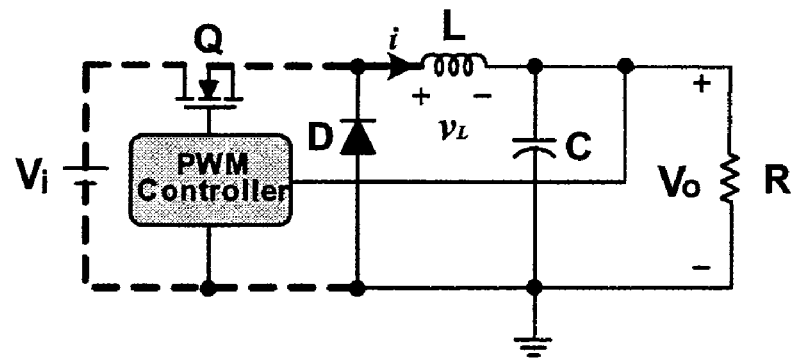
[FIG. 7C]
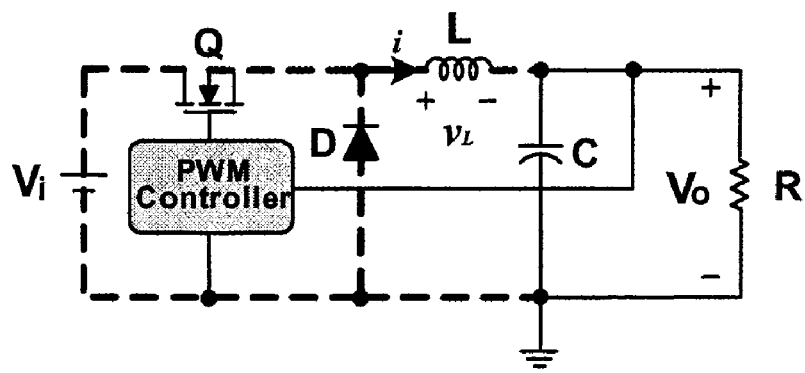

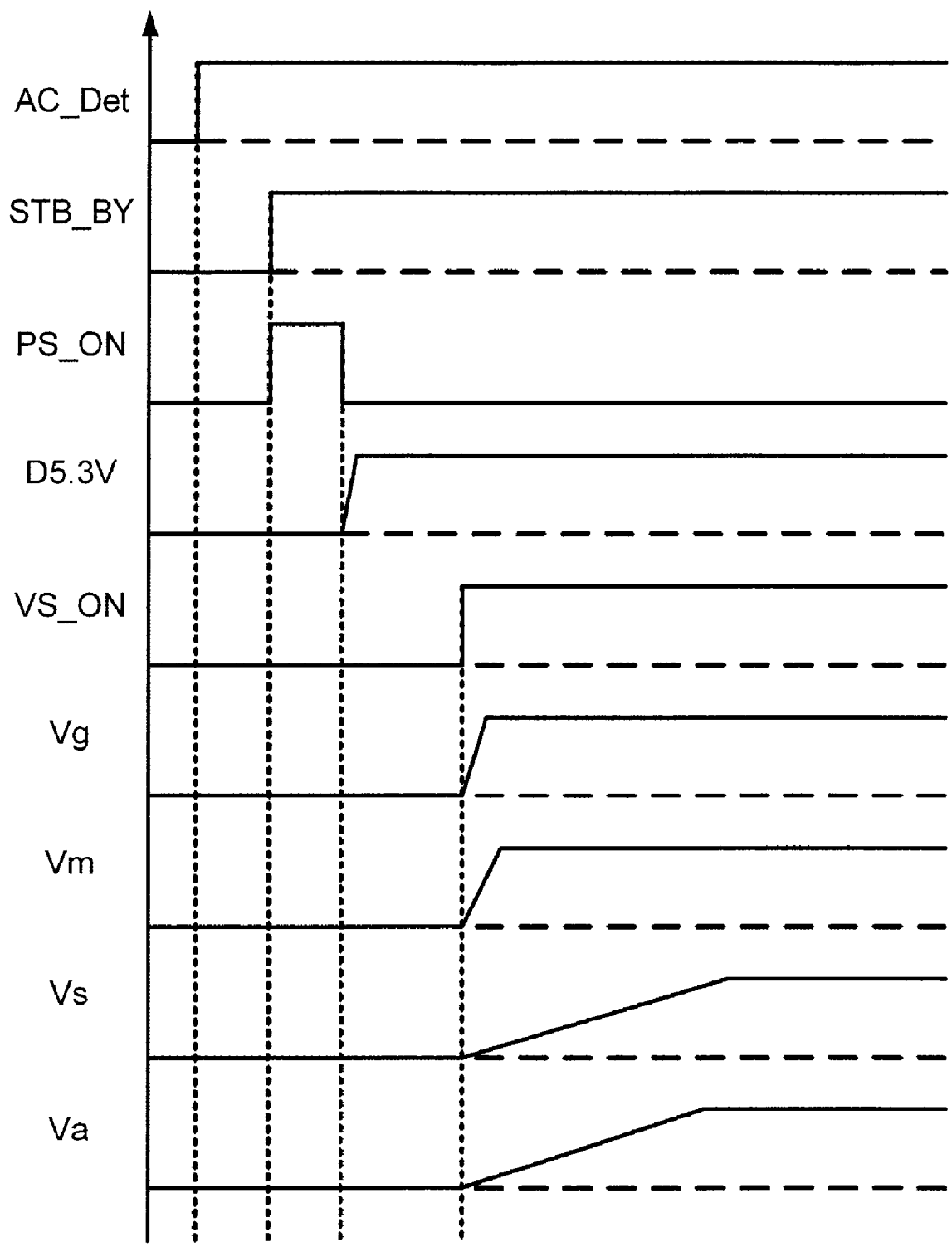
[FIG. 8]

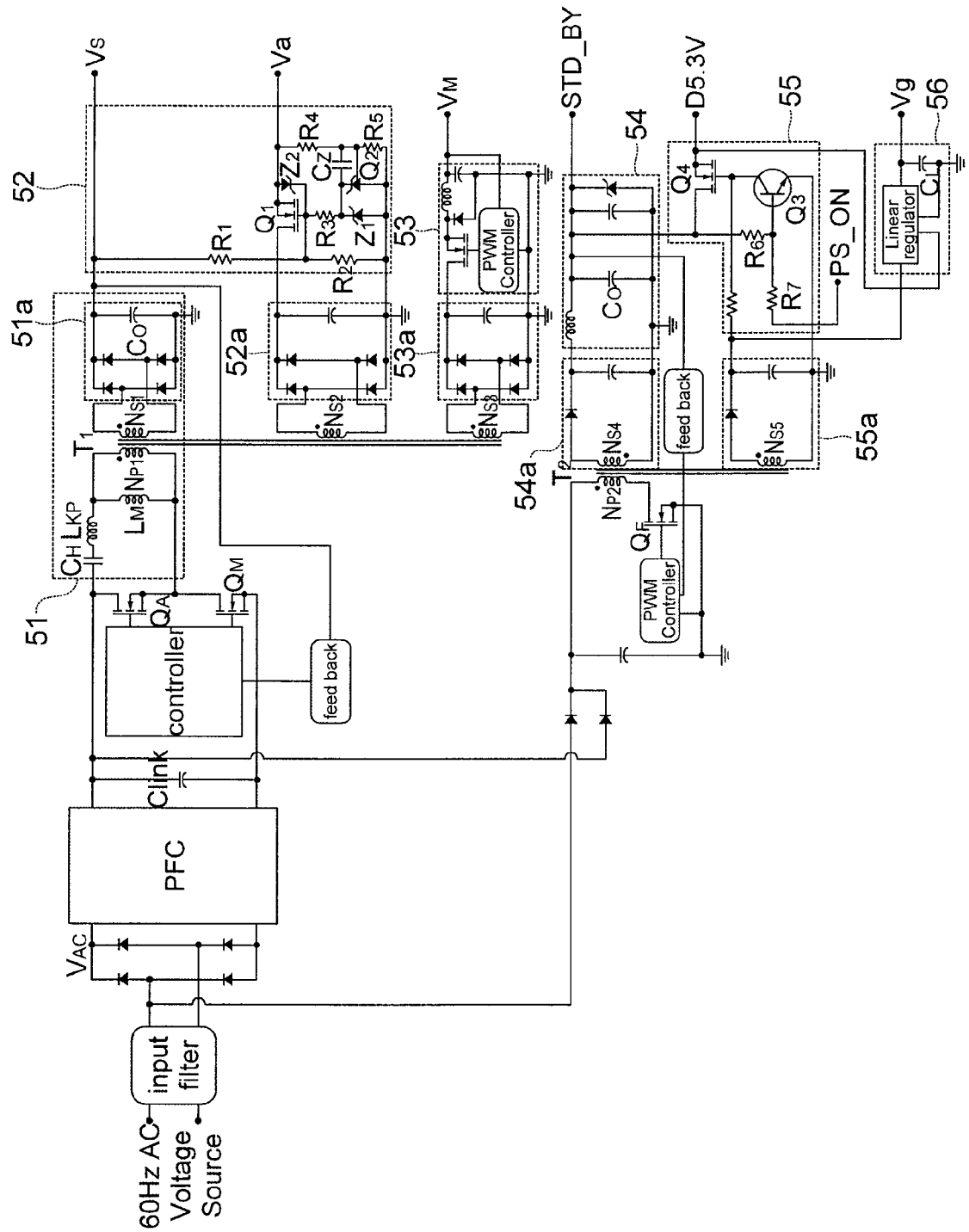
[FIG. 9]

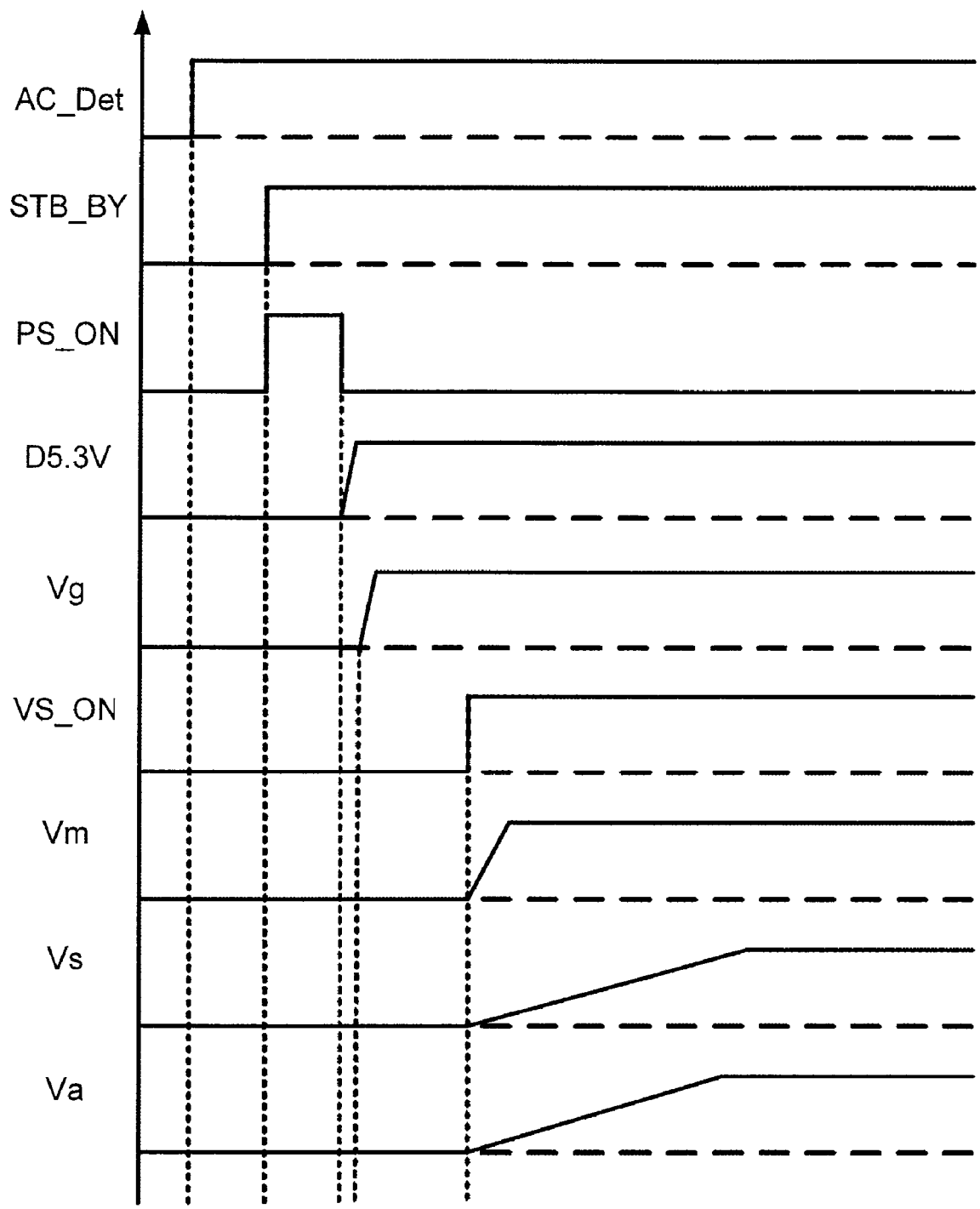
[FIG.10]

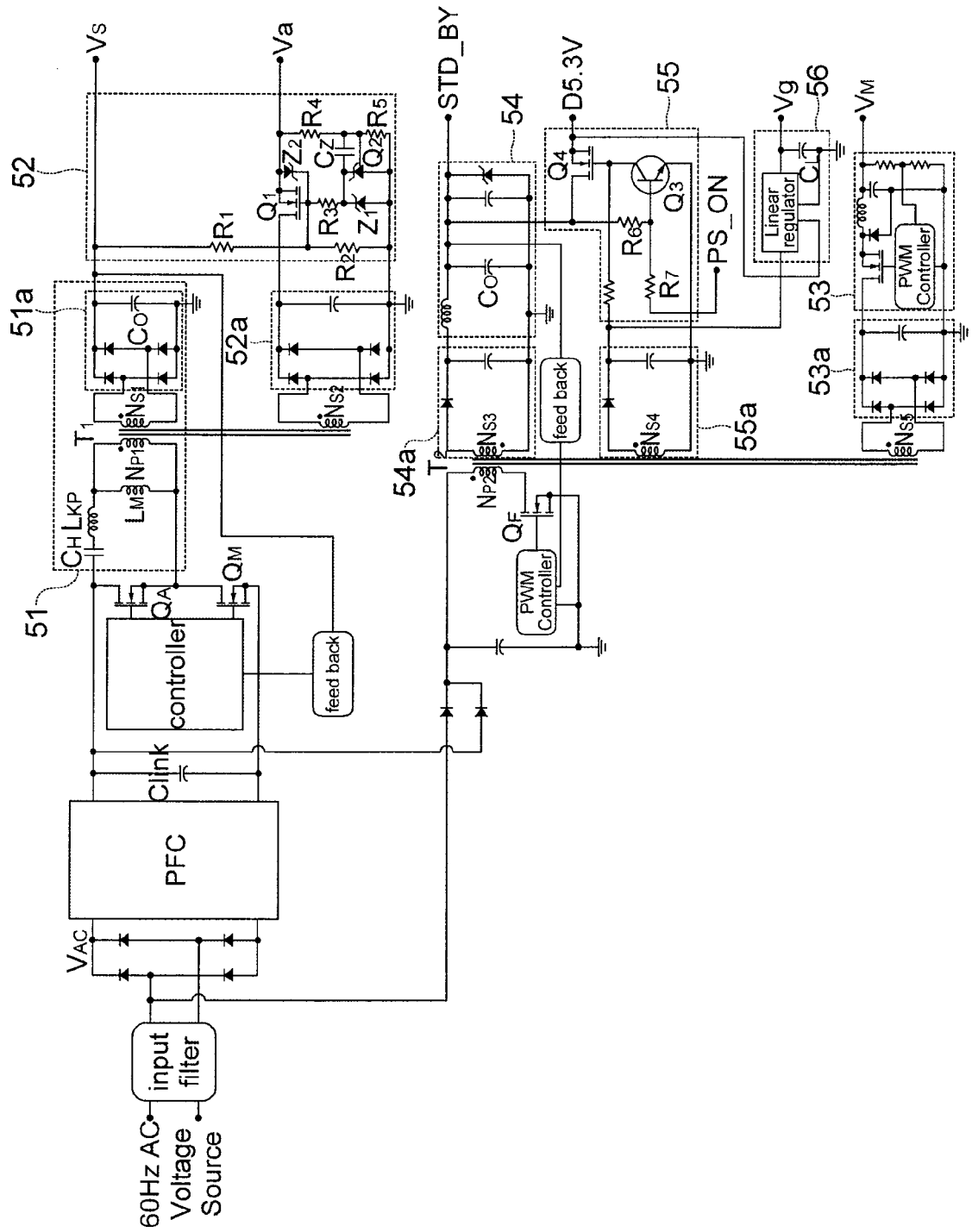
[FIG. 11]

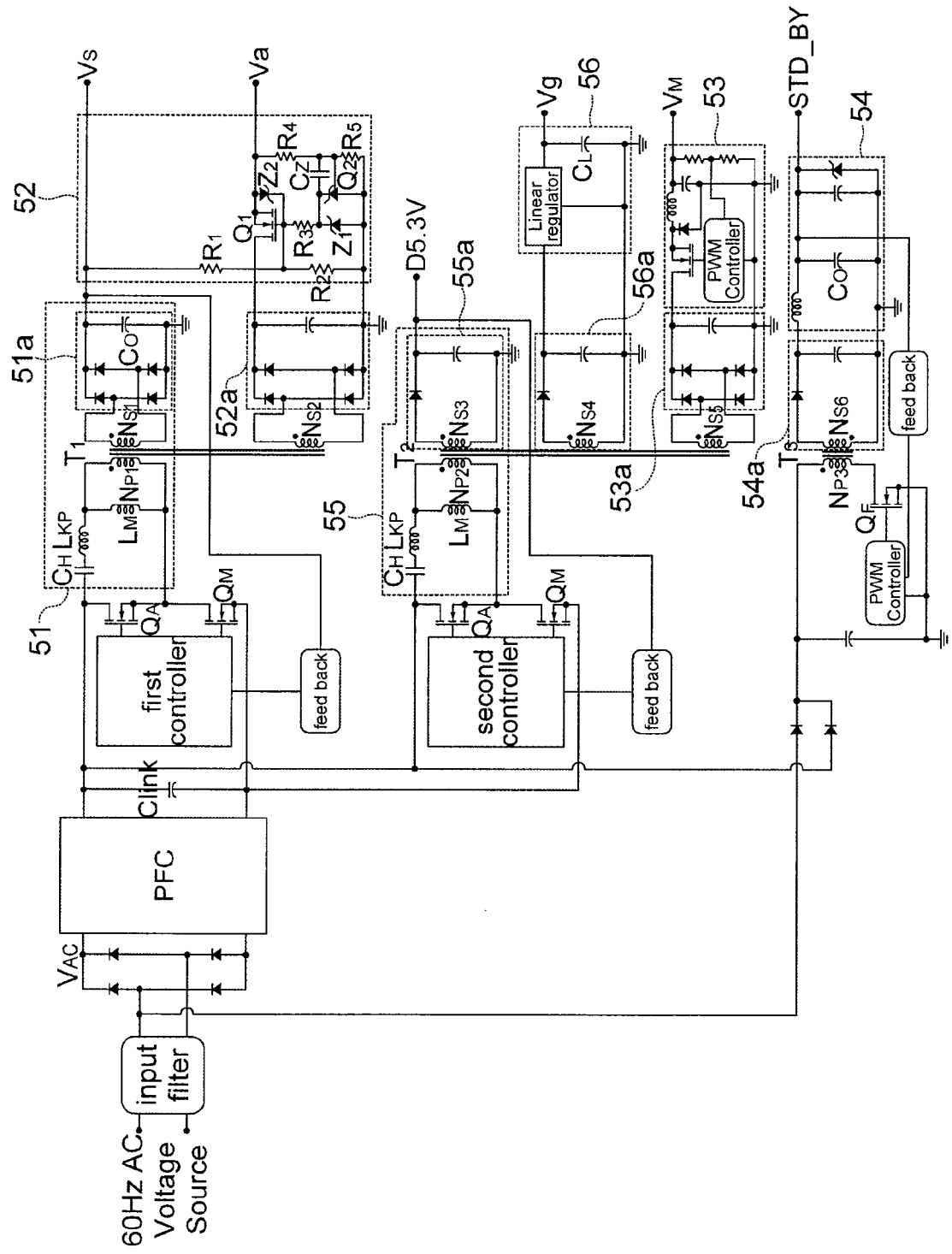
[FIG. 12]

SWITCHING MODE POWER SUPPLY FOR PLASMA DISPLAY PANEL

BACKGROUND OF THE INVENTION

1. Field of the Invention

The present invention relates to an SMPS (Switching Mode Power Supply) circuit for a Plasma Display Panel (hereinafter, referred to as 'PDP'); and, more particularly, to an SMPS circuit capable of reducing the total size and volume of a PDP power system by driving a plurality of DC/DC converters for supplying high sustain voltage and address voltage and a plurality of low voltages with one transformer and capable of improving power conversion efficiency and reliability by using a clamp circuit.

2. Description of the Related Art

Generally, a PDP as a flat panel display device using a penning gas in a discharge phenomenon is a display device using a luminescent phenomenon caused by discharge generated between narrow electrodes coated with a dielectric by using a Ne or He gas, or the like of a relatively high pressure as a base gas.

The PDP is thinner and lighter than a CRT (Cathode-Ray Tube) which has been principally used as a display means and has an advantage to realize a large screen with high definition. Further, the PDP includes a plurality of DC/DC converters generating various voltages for supplying high voltages (Vs, Va, Vset, Vscan and so on) for plasma discharge and supplying a plurality of low voltages to an image processing unit, a fan, an audio, and so on.

FIG. 1 is a block diagram showing an example of a conventional PDP power system. As shown in FIG. 1, the conventional PDP power system is inputted with $90 \sim 270 V_{rms}$ from a commercial line input source 1 and set-up or boosted-up through a PFC (Power Factor Correction) 2 for avoiding harmonic wave regulation to output a DC voltage of approximately $370 \sim 400 V_{DC}$ and supply various powers needed in PDP driving through a plurality of DC/DC converters from the outputted DC voltage.

First of all, the PFC 2 for performing improvement of power factor is positioned on the most front stage of the SMPS for PDP and mainly adopts Boost topology representing an excellent characteristic in a PFC performance.

The output voltage of the PFC 2 is inputted to a plurality of DC/DC converters 3~7 for supplying high voltage of sustain driving power and address power and to a DC/DC converter 8 for supplying a plurality of low voltages. At this time, the output of Vs 3 power is used as the sustain driving power and inputted to a scan voltage ($V_{SCAN}$) 4 and reset voltages ($V_{SET}$ and $V_E$) 5 and 6. The voltages outputted from the DC/DC converters are inputted to a PDP driving module 9 to drive a PDP device.

Meanwhile, in FIG. 1, a plurality of low voltage elements supplied with the low voltages by the DC/DC converter 8 for supplying the low voltages are represented by one Multi 10.

FIG. 2 is a graph showing a power on sequence of a conventional PDP power system.

As shown in FIG. 2, powers should be applied according to the sequence shown in FIG. 2 and the reason is as follows.

Generally, a PDP power system is characterized by a high voltage and a low current and therefore is considerably influenced by switching loss rather than conduction loss.

Further, because a very large surge current flows in the PDP in case of discharge according to a luminescence principle, a plurality of large capacitors should be added to a power and driving board in parallel in case of the sustain voltage and the address voltage and because a driving module of the PDP supplies a lot of electrodes with powers needed for each of the electrodes by high-speed switching, the PDP is mostly composed of switching elements using semiconductors.

Therefore, in order to protect the switching elements and prevent anomalous discharge from being generated in case of primary power application, the powers should be applied according to the sequence as shown in FIG. 2.

Accordingly, in recent, the powers are generally applied in sequence of a low voltage system (for signal processing and driving) Vcc, an address system Va and a sustain system $V_S$ and the powers are reversely removed.

FIG. 3 is a circuit diagram of a conventional SMPS circuit for PDP. As shown in FIG. 3, the SMS circuit includes a plurality of DC/DC converters 31~34 for supplying a sustain voltage Vs, an address voltage Va, a plurality of low voltages $V_M$, and a standby voltage STD_BY. At this time, the standby voltage STD_BY is a driving voltage for driving elements of the SMPS circuit for PDP.

The DC/DC converters 31~34 are insulating type converters using three transformers T1, T2 and T3 for electric insulation between input and output. At this time, a DC/DC converter 31 for supplying the sustain voltage $V_S$ is a half-bridge converter, DC/DC converters 32 and 34 for supplying the address voltage Va and the standby voltage STD_BY are flyback converters, and a DC/DC converter 33 for supplying the low voltages $V_M$ is a buck-converter as a step-down type converter.

At this time, because voltage stress applied to switching elements $Q_A$ and $Q_M$ has the same size as that of input voltage and each switch driving waveform has a half-wave symmetry shape, the half-bridge converter 31 is widely utilized as a structure suitable for a high-capacity converter, wherein the switching elements are controlled through a controller in a Pulse Width Modulation (hereinafter, referred to as 'PMW') or Pulse Frequency Modulation (hereinafter, referred to as 'PFM') method.

Further, the flyback converters 32 and 34 of which inputs and outputs are insulated are most frequently used as a circuit having the smallest number of components and the buck-converter 33 is a DC to DC converter realized by stepping-down an input voltage to obtain an output voltage with a desired voltage, wherein the output voltage is lower than the input voltage.

Referring to FIG. 3, hereinafter, an operation principle is briefly described. First of all, after diving an input voltage of a PFC by using a capacitor ($C_{link}$), two switching devices $Q_A$ and $Q_M$ with an operation duty ratio or an operation frequency adjusted by a controller are alternately switched, an AC voltage of a square waveform is transmitted to a secondary side of a transformer T1, the transmitted AC voltage is rectified through a plurality of half-bridge type diodes, and then the rectified AC voltage is smoothed by a capacitor $C_O$ to obtain a DC voltage $V_S$ and stabilize an output voltage $V_S$ with a feedback circuit.

At this time, a linear regulator outputting a driving voltage Vg by receiving the low voltage $V_M$ outputs a gate voltage Vg of the switching element included in the PDP driving module (not shown) with a predetermined size always.

And, a high power MOSFET (Metal Oxide Semiconductor Field-Effect Transistor) is mainly used as a switching device in the conventional SMPS circuit. The above-mentioned operation principle is related to the half-bridge 31, however, the operation principle of the flyback converters 32 and 34 are almost the same.

However, the conventional SMPS circuit for PDP has advantages that the transformers T1 and T2 are required for each of the DC/DC converters for supplying the sustain voltage $V_S$ and the address voltage Va and thus a space occupied by components is enlarged to increase the size and volume of the PDP power system over all, thereby increasing a manufacturing cost.

Meanwhile, FIG. 4 is a graph showing a load characteristic of a sustain voltage output stage and an address voltage output stage according to a conventional PDP driving manner. As shown in FIG. 4A and FIG. 4B, the load of the sustain voltage output stage and the address voltage output stage has a complicated load characteristic to repeat overload from no-load at a period of 16.67 ms.

But, as shown in FIG. 4C, the sum of the load characteristic of each of the stages in case of PDP operation is nearly uniform and when using such a characteristic, it is possible to facilitate optimal voltage control of a PDP power and improve power conversion efficiency and reliability since there is little change of the operation frequency or the operation duty ratio.

However, the conventional SMPS circuit for PDP has a disadvantage that it is not possible to use such a characteristic as shown in FIG. 4C by using the transformers for each of the DC/DC converters for supplying the sustain voltage $V_S$ and the address voltage Va, and therefore the optimal voltage control of the PDP power is difficult and the change of the operation frequency or the operation duty ratio is extreme to reduce the power conversion efficiency and the reliability.

SUMMARY OF THE INVENTION

The present invention has been invented in order to overcome the above-described disadvantages and it is one object of the present invention to provide an SMPS circuit for PDP capable of reducing a manufacturing cost as well as the total size and volume of a PDP power system by reducing a space occupied by components through the use of one insulating transformer.

Further, it is another object of the present invention to provide an SMPS circuit for PDP capable of facilitating optimal voltage control of a PDP power and improving power conversion efficiency and reliability by using one insulating transformer.

Further, it is still another object of the present invention to provide an SMPS circuit for PDP capable of satisfying a power on sequence required in a PDP power system even when integrally designing output stages for supplying various voltages with one transformer.

The objects and advantages of the present invention will be appreciated through the following description and will be more apparent through preferable embodiments of the present invention. Further, it will be readily appreciated that the objects and advantages of the present invention will be realized by units and the combination thereof in the appended claims.

In accordance with a first embodiment of the present invention to achieve the object, there is provided an SMPS circuit for PDP including first and second transformers inducing voltages supplied to primary sides to secondary sides; a plurality of DC/DC converters connected to secondary sides of the first and second transformers and supplying voltages of different sizes; a clamp circuit connected to the secondary side of the first transformer and outputting an address voltage of a predetermined size by receiving a voltage supplied from the first transformer; and a linear regulator unit connected to the DC/DC converter for supplying a low voltage among the DC/DC converters connected to the secondary side of the first transformer and outputting a gate voltage of a predetermined size by receiving the low voltage supplied from the DC/DC converter.

Herein, any one of the DC/DC converters includes the first transformer and a first rectification unit connected to a first winding of the secondary side of the first transformer and supplies a sustain voltage.

Further, any one of the DC/DC converters is connected to the first transformer and a third rectification unit connected to a third winding of the secondary side of the first transformer and supplies a low voltage.

And, any one of the DC/DC converters is connected to the second transformer and a fourth rectification unit connected to a first winding of the secondary side of the second transformer and supplies a standby voltage.

Further, any one of the DC/DC converters is connected to the second transformer and a fifth rectification unit connected to a second winding of the secondary side of the second transformer and supplies a driving voltage.

Herein, the DC/DC converter for supplying the sustain voltage is a half-bridge resonance type converter.

At this time, the clamp circuit for supplying the address voltage includes first and second resistors dividing the sustain voltage; a first switching unit having a gate connected to contacts of the first and second resistors and a drain connected to a second rectification unit connected to the second winding of the secondary side of the first transformer to output the address voltage through a source; a third resistor having one end connected to the gate of the first switching unit; a first Zener diode having a cathode connected to the other end of the third resistor and an anode connected to the ground; a second Zener diode having a cathode connected to the one end of the third resistor and an anode connected to the source of the first switching unit; fourth and fifth resistors dividing the address voltage; a capacitor having one end connected to contacts of the fourth and fifth resistors and the other end connected to the cathode of the first Zener diode; and a second switching unit having a cathode connected to the other end of the capacitor, an anode connected to the ground, and a gate connected to the contacts of the fourth and fifth resistors.

Further, the DC/DC converter for supplying the low voltage is a buck-converter and the DC/DC converter for supplying the standby voltage is a flyback-converter. The DC/DC converter for supplying the driving power includes a sixth resistor having one end connected to the DC/DC converter for supplying the standby voltage; a seventh resistor having one end connected to the other end of the sixth resistor and the other end applied with a switching voltage from the outside; a third switching unit having a gate connected to contacts of the sixth and seventh resistors and a source connected to the ground and controlled by a switching voltage; and a fourth switching unit having a gate connected to a drain of the third switching unit and a drain connected to the sixth resistor to output the driving voltage through a source.

Further, in accordance with a second embodiment of the present invention to achieve the object, there is provided an SMPS circuit for PDP including first and second transformers inducing voltages supplied to primary sides to secondary sides; a plurality of DC/DC converters connected to secondary sides of the first and second transformers and supplying voltages of different sizes; a clamp circuit connected to the secondary side of the first transformer and outputting an address voltage of a predetermined size by receiving a voltage supplied from the first transformer; and a linear regulator unit connected to the DC/DC converters for supplying a driving voltage of the DC/DC converters connected to the secondary side of the second transformer and outputting a gate voltage of a predetermined size by receiving the driving voltage supplied from the DC/DC converter.

Herein, any one of the DC/DC converters is connected to the first transformer and a first rectification unit connected to a first winding of the secondary side of the first transformer and supplies a sustain voltage.

Further, any one of the DC/DC converters is connected to the first transformer and a third rectification unit connected to a third winding of the secondary side of the first transformer and supplies a low voltage.

And, any one of the DC/DC converters is connected to the second transformer and a fourth rectification unit connected to a first winding of the secondary side of the second transformer and supplies a standby voltage.

Further, any one of the DC/DC converters is connected to the second transformer and a fifth rectification unit connected to a second winding of the secondary side of the second transformer and supplies a driving voltage.

Herein, the DC/DC converter for supplying the sustain voltage is a half-bridge resonance type converter.

At this time, the clamp circuit for supplying the address voltage includes first and second resistors dividing the sustain voltage; a first switching unit having a gate connected to contacts of the first and second resistors and a drain connected to a second rectification unit connected to the second winding of the secondary side of the first transformer to output the address voltage through a source; a third resistor with one end connected to the gate of the first switching unit; a first Zener diode having a cathode connected to the other end of the third resistor and an anode connected to the ground; a second Zener diode having a cathode connected to the one end of the third resistor and an anode connected to the source of the first switching unit; fourth and fifth resistors dividing the address voltage; a capacitor having one end connected to contacts of the fourth and fifth resistors and the other end connected to the cathode of the first Zener diode; and a second switching unit having a cathode connected to the other end of the capacitor, an anode connected to the ground, and a gate connected to the contacts of the fourth and fifth resistors.

Further, the DC/DC converter for supplying the low voltage is a buck-converter and the DC/DC converter for supplying the standby voltage is a flyback-converter. The DC/DC converter for supplying the driving power includes a sixth resistor having one end connected to the DC/DC converter for supplying the standby voltage; a seventh resistor having one end connected to the other end of the sixth resistor and the other end applied with a switching voltage from the outside; a third switching unit having a gate connected to contacts of the sixth and seventh resistors and a source connected to the ground and controlled by the switching voltage; and a fourth switching unit having a gate connected to a drain of the third switching unit and a drain connected to the sixth resistor to output the driving voltage through a source.

Further, in accordance with a third embodiment of the present invention to achieve the object, there is provided an SMPS circuit for PDP provided with a plurality of DC/DC converters for supplying high sustain voltage and address voltage, a plurality of low voltages, a standby voltage, a driving voltage and a gate voltage, including first and second transformers inducing voltages supplied to primary sides to secondary sides; a first DC/DC converter connected to the secondary side of the first transformer and outputting the sustain voltage; a clamp circuit connected to the secondary side of the first transformer and outputting the address voltage of a predetermined size by receiving a voltage supplied from the first transformer; a second DC/DC converter connected to the secondary side of the second transformer and outputting the standby voltage; a third DC/DC converter connected to the secondary side of the second transformer and outputting the driving voltage; a linear regulator unit outputting the gate voltage of a predetermined size by receiving the driving voltage supplied from the third DC/DC converter; and a fourth DC/DC converter connected to the secondary side of the second transformer and outputting the plurality of low voltages.

And, in accordance with the fourth embodiment of the present invention to achieve the object, there is provided an SMPS circuit for PDP provided with a plurality of DC/DC converters for supplying high sustain voltage and address voltage, a plurality of low voltages, a standby voltage, a driving voltage and a gate voltage, including first to third transformers inducing voltages supplied to primary sides to secondary sides; a first DC/DC converter connected to the secondary side of the first transformer and outputting the sustain voltage; a clamp circuit connected to the secondary side of the first transformer and outputting the address voltage of a predetermined size by receiving a voltage supplied from the first transformer; a second DC/DC converter connected to a secondary side of the third transformer and outputting the standby voltage; a third DC/DC converter connected to the secondary side of the second transformer and outputting the driving voltage; a fourth DC/DC converter connected to the secondary side of the second transformer and outputting a linear regulator unit; and a fifth DC/DC converter connected to the secondary side of the second transformer and outputting the plurality of low voltages.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a block diagram showing an example of a conventional PDP power system;

FIG. 2 is a graph showing a power on sequence of a conventional PDP power system;

FIG. 3 is a circuit diagram of a conventional SMPS circuit for PDP;

FIG. 4 is a graph showing a load characteristic of a sustain voltage output stage and an address voltage output stage according to a conventional PDP driving manner;

FIG. 5 is a circuit diagram showing an SMPS circuit for PDP in accordance with a first embodiment of the present invention;

FIG. 6 is a basic circuit diagram of a buck-converter;

FIG. 7 is a view showing an operation process of a buck-converter in FIG. 6;

FIG. 8 is a timing diagram showing the SMPS circuit for PDP in accordance with the first embodiment of the present invention;

FIG. 9 is a circuit diagram showing an SMPS circuit for PDP in accordance with a second embodiment of the present invention;

FIG. 10 is a timing diagram showing the SMPS circuit for PDP in accordance with the second embodiment of the present invention;

FIG. 11 is a circuit diagram showing an SMPS circuit for PDP in accordance with a third embodiment of the present invention; and FIG. 12 is a circuit diagram showing an SMPS circuit for PDP in accordance with a fourth embodiment of the present invention;

DETAILED DESCRIPTION OF THE PREFERRED EMBODIMENTS

The objects, characteristics and advantages of the present invention will be more clearly appreciated through the following description with reference to the accompanying drawings, and therefore those skilled in the art can easily perform technical spirit of the present invention.

Further, detailed description for known art related to the present invention will be omitted when the clarity of the present invention is unnecessarily deteriorated by the detailed description.

Hereinafter, preferable embodiments in accordance with the present invention will be described in detail with reference to the accompanying drawings.

First Embodiment

FIG. 5 is a circuit diagram showing an SMPS circuit for PDP in accordance with a first embodiment of the present invention. As shown in FIG. 5, in accordance with the first embodiment, the SMPS circuit for PDP includes a plurality of DC/DC converters 51~55 for supplying high sustain voltage $V_S$ and address voltage Va, a plurality of low voltages $V_M$, a standby voltage STD_BY and a driving voltage Vg and two insulating transformers T1 and T2.

Herein, the DC/DC converter 51 for supplying the sustain voltage $V_S$ includes the first transformer T1 and a first rectification unit 51a which is connected to a first winding $N_{S1}$ of a secondary side of the first transformer T1 and provided with a plurality of diodes and a capacitor Co.

At this time, a flyback-converter, a forward converter, a full-bridge converter, a half-bridge converter, and so on may be used as the DC/DC converter 51.

However, in the flyback-converter, since surge current generated by a reverse recovery characteristic during turning off an output diode increases current stress of a switch and further shapes of a + waveform and a − waveform of a voltage outputted on both ends of the diode are not matched due to resonance between a leakage inductor of a transformer and an output diode junction capacitor, it is preferable to use a half-bridge resonance type converter which is suitable for a low cost type due to high input and output conversion efficiency and a small number of elements and has stable input and output voltages by reducing stress of a switching element.

At this time, the switching element used for the half-bridge resonance type converter is controlled by a controller in a Pulse Width Modulation (hereinafter, referred to as 'PWM') or Pulse Frequency Modulation (hereinafter, referred to as 'PFM') method and an MOSFET (Metal Oxide Semiconductor Field-Effect Transistor) for high power is preferably used as the switching element used for switching.

Further, a clamp circuit 52 is used to supply the address voltage Va, wherein the clamp circuit 52 is connected to the first transformer T1 and a second winding $N_{S2}$ of a secondary side of the first transformer T1 and uses a voltage outputted from a second rectification unit 52a provided with a plurality of diodes and a capacitor as an input voltage.

At this time, the clamp circuit 52 outputting the address voltage Va of an always predetermined size by fixing a voltage outputted from the second rectification unit 52a at a predetermined size, includes first and second resistors R1 and R2 dividing the sustain voltage $V_S$, a first switching unit Q1 having a gate which is connected to contacts of the first and second resistors R1 and R2 and a drain which is connected to a second rectification unit 52a, a third resistor R3 with one end which is connected to the gate of the first switching unit Q1, a first Zener diode Z1 having a cathode which is connected to the other end of the third resistor R3 and an anode which is connected to the ground, a second Zener diode Z2 having a cathode which is connected to the one end of the third resistor R3 and an anode is connected to the source of the first switching unit Q1, fourth and fifth resistors R4 and R5 dividing the address voltage, a capacitor $C_Z$ having one end which is connected to contacts of the fourth and fifth resistors R4 and R5 and the other end which is connected to the cathode of the first Zener diode Z1, and a second switching unit Q2 having a cathode which is connected to the other end of the capacitor $C_Z$, an anode which is connected to the ground, and a gate which is connected to the contacts of the fourth and fifth resistors R4 and R5.

The clamp circuit 52 constructed as described above divides the sustain voltage $V_S$ outputted from the DC/DC converter 51 for supplying the sustain voltage Va in the first and second resistors R1 and R2. The sustain voltage $V_S$ is linearly increased and when the voltage divided by the first and second resistors R1 and R2 is more than a conduction voltage of the first switching unit Q1, the first switching unit Q1 is conducted by the divided voltage to output the voltage rectified by the second rectification unit 52a as the address voltage Va. At this time, when the address voltage Va is increased at more than a predetermined uniform voltage (conduction voltage of the second switching unit Q2), the second switching unit Q2 is conducted to ground the voltage outputted from the second rectification unit 52a, whereby the first switching unit Q1 is turned off. The address voltage Va is reduced by turning off the first switching unit Q1 and therefore the second switching unit Q2 is turned off, and when the sustain voltage $V_S$ is more than the conduction voltage of the first switching unit Q1, the address voltage Va is supplied at an always predetermined size by repeating the process and controlling the address voltage.

A DC/DC converter 53 for supplying a plurality of low voltages is connected to the first transformer T1 and a third winding $N_{S3}$ of the secondary side of the first transformer T1 and uses a voltage outputted from a third rectification unit 53a provided with a plurality of diodes and a capacitor as an input voltage.

A boost converter as a step-up type transformer or a buck-converter as a step-down type transformer capable of converting into a desired voltage may be used as the DC/DC converter 53 for supplying the low voltages $V_M$ and in the present embodiment, the buck-converter as the step-down type transformer is used.

Further, a linear regulator 56 for supplying the gate voltage Vg outputs the gate voltage Vg of the switching unit included in a PDP driving module (not shown) at an always uniform predetermined size by receiving the low voltages $V_M$ outputted from the DC/DC converter 53.

FIG. 6 is a basic circuit diagram of a buck-converter and FIG. 7 shows an operational mode of the buck-converter in FIG. 6. Hereinafter, the operation process of the buck-converter will be briefly described with reference to FIG. 6 and FIG. 7.

First of all, when a switch Q is conducted, an equivalent circuit is formed as shown in FIG. 7A. At this time, an inductor current i is increased from 0 and therefore energy is stored in an inductor L, whereby a diode D is turned off.

Then, when the switch Q is turned off, an equivalent circuit is formed as shown in FIG. 7B and the energy stored in the inductor L is emitted to an outside side through a freewheeling diode D. At this time, the current i is gradually reduced to 0.

Meanwhile, when the current i becomes 0 in a state in which the switch Q is turned off, the freewheeling diode D is also turned off, and therefore an equivalent circuit is formed as shown in FIG. 7C. At this time, the electric charges charged from an output capacitor C is discharged as output.

And, a DC/DC converter 54 for supplying a standby voltage STD_BY for driving elements constituting the SPMS circuit for PDP as a flyback-convert is connected to a first winding of a secondary side of the second transformer T2 and uses a voltage outputted from a fourth rectification unit 54a provided with a diode and a capacitor as an input voltage.

Further, a DC/DC converter 55 for supplying a driving power D5.3V to drive elements constituting the PDP driving module is connected to the second transformer T2 and a second winding of the secondary side of the second transformer T2 and uses a voltage outputted from a fifth rectification unit 55a provided with a diode and a capacitor as an input voltage.

At this time, a DC/DC converter 55 for supplying the driving voltage D5.3V includes a sixth resistor R6 having one end which is connected to the DC/DC converter 54 for supplying the standby voltage STD_BY, a seventh resistor R7 having one end which is connected to the other end of the sixth resistor R6, a third switching unit Q3 having a gate which is connected to contacts of the sixth and seventh resistors R6 and R7 and a source which is connected to the ground and a fourth switching unit Q4 having a gate which is connected to a drain of the third switching unit Q3 and a drain which is connected to the sixth resistor R6.

In the DC/DC converter 55, when a switching voltage PS-ON is applied at a high level to conduct the third switching unit Q3, the third switching unit Q3 is conducted through the seventh resistor R7 and the fourth switching unit Q4 is turned off not to output the driving power D5.3V, and when the switching voltage PS_ON is applied at a low level, the fourth switching unit Q4 receives a voltage outputted from the fifth rectification unit and conducted to supply the driving voltage D5.3V.

Hereinafter, an operation principle and a power on sequence of the SMS circuit for PDP in accordance with the first embodiment of the present invention will be briefly described with reference to FIG. 5 to FIG. 7 and FIG. 8 showing operation timing of the SMS circuit for PDP.

A DC voltage of 370~400V inputted from a PFC is inputted to primary coils of the first and second transformers T1 and T2 by being converted into AC with square waveforms through switching elements $Q_A$ and $Q_M$ controlled by the controller in the PWM or PFM method and the standby voltage STD_BY for operating the elements of the SMPS circuit for PDP is supplied by the first rectification unit 54a connected to the first winding of the secondary side of the second transformer T2 and the DC/DC converter 54.

After the standby voltage STD_BY is supplied, when the switching voltage PS_ON is changed from the high level to a low level, the fourth switching unit PS_ON is conducted to supply the driving voltage D5.3V.

After the driving voltage D5.3V is supplied, when a signal VS_ON for supplying the sustain voltage $V_S$ is changed from a low level to a high level, a power is supplied through the first transformer T1 and the low voltage $V_M$ and the gate voltage Vg of 15V are supplied by the DC/DC converter 53.

After a predetermined time, the AC voltage transmitted to the secondary side of the first transformer T1 is rectified through the diodes of the half-bridge type second rectification unit 52a, smoothed through the capacitor and then inputted to the clamp circuit 52 to supply the address voltage Va of 60V.

After the address voltage Va is supplied, the AC voltage transmitted to the secondary side of the first transformer is rectified through the diodes of the half-bridge type first rectification unit 51a, smoothed through the capacitor Co to supply the sustain voltage $V_S$ of approximately 200V.

At this time, the power applied through the first transformer T1 is simultaneously applied to the clamp circuit 52 and the DC/DC converter 51 for supplying the address voltage Va and the sustain voltage $V_S$ through the first and second rectification units 51a and 52a, however, the sizes of the supplied address voltage Va and sustain voltage $V_S$ are different from each other as 60V and 200V respectively, and therefore the sustain voltage $V_S$ needing relatively higher voltage than the address voltage Va is supplied later.

As described above, the SMPS circuit for PDP in accordance with the first embodiment as shown in FIG. 5 is capable of reducing a space occupied by components in comparison with a conventional SMPS circuit for PDP needing transformers for each of the DC/DC converters by using one insulating transformer for supplying the sustain voltage $V_S$, the address voltage Va, the low voltages $V_M$ and the gate voltage Vg, thereby reducing the total size and volume of a PDP power system and further a manufacturing cost thereof.

Further, in accordance with the first embodiment of the present invention, a main feedback voltage control part is achieved at the sustain voltage $V_S$ and has a structure to generate the low voltages $V_M$ and the gate voltage Vg for the PDP power by using additional step-down type converters, thereby satisfying the power on sequence as shown in FIG. 2 even when various voltages output stages are integrated with one transformer.

Second Embodiment

Hereinafter, an SMPS circuit for PDP in accordance with a second embodiment of the present invention will be described with reference to FIG. 9. Only, description for the same construction of the second embodiment as that of the first embodiment will be omitted and only different construction thereof from that of the first embodiment will be described in detail.

FIG. 9 is a circuit diagram showing the SMPS circuit for PDP in accordance with the second embodiment of the present invention. As shown in FIG. 9, the SMPS circuit for PDP in accordance with a second embodiment like that of the first embodiment, supplies high sustain voltage $V_S$ and address voltage Va and a plurality of low voltages $V_M$ through one insulating transformer T1 and supplies a standby voltage STD_BY, a driving voltage D5.3V and a gate voltage Vg through the other insulating transformer T2.

At this time, a linear regulator 56 connected to the DC/DC converter 53 for outputting the low voltages $V_M$ by being connected to the third winding of the secondary of the first transformer to supply the gate voltage Vg in the first embodiment, is connected to a fifth rectification unit 55a and applied with a voltage inputted by a DC/DC converter 55 for supplying the driving voltage D5.3V to output the gate voltage Vg. At this time, On/off of the linear regulator 56 is controlled according to a high or low level state of the driving voltage D5.3V by using the driving voltage D5.3V as a control signal.

As shown in FIG. 10, according to a voltage applying order of the SMPS circuit for PDP in accordance with the second embodiment of the present invention, the driving voltage D5.3V is supplied and the linear regulator 56 is turned on by the supplied driving voltage D5.3V to output the gate voltage Vg as an output voltage of the linear regulator 56. At this time, the gate voltage Vg is a voltage supplied to an element included in the PDP driving module and it is permissible to apply the gate voltage Vg prior to application of the sustain voltage $V_S$, the address voltage Va and the low voltages $V_M$.

Therefore, in accordance with the second embodiment of the present invention, the SMPS circuit for PDP has an advantage to satisfy the power on the sequence as shown in FIG. 2 by connecting the linear regulator 56 to a second transformer T2 to output the gate voltage Vg and connecting the linear regulator to a DC/DC converter 55 for supplying the driving voltage D5.3V.

Third Embodiment

Hereinafter, an SMPS circuit for PDP in accordance with a third embodiment of the present invention will be described in detail with reference to related drawings.

FIG. 11 is a circuit diagram showing the SMPS circuit for PDP in accordance with the third embodiment of the present invention.

In accordance with the third embodiment of the present invention, the SMPS circuit for PDP includes first and second transformers T1 and T2 inducing voltages supplied to primary sides to secondary sides, first to fourth DC/DC converters 51, 54, 55 and 53, a clamp circuit 52 and a linear regulator 56.

At this time, the first DC/DC converter 51 and the clamp circuit 52 are connected to the first transformer T1 and the second and third DC/DC converters 54 and 55 and the linear regulator unit 56 are connected to the second transformer T2.

The first DC/DC converter 51 is connected to the secondary side of the first transformer and outputs a sustain voltage $V_S$.

Further, the clamp circuit 52 is connected to the secondary side of the first transformer T1 and applied with a voltage supplied from the first transformer T1 to output an address voltage Va of a predetermined size.

The second DC/DC converter 54 is connected to the secondary side of the second transformer T2 and outputs a standby voltage STD_BY The third DC/DC converter 55 is connected to the secondary side of the second transformer T2 and outputs a driving voltage D5.3V.

Further, the linear regulator unit 56 outputs a gate voltage Vg of a predetermined size by receiving the driving voltage D5.3V supplied from the third DC/DC converter 55 and the fourth DC/DC converter 53 is connected to the secondary side of the second transformer T2 and outputs a plurality of low voltages $V_M$. At this time, on/off of the linear regulator 56 and the plurality of low voltages $V_M$ are controlled according to a high or low level state of the driving voltage D5.3V by using the driving voltage D5.3V as a control signal to satisfy the power on the sequence as shown in FIG. 2.

Fourth Embodiment

Hereinafter, an SMPS circuit for PDP in accordance with a fourth embodiment of the present invention will be described in detail with reference to related drawings FIG. 12 is a circuit diagram showing the SMPS circuit for PDP in accordance with the fourth embodiment of the present invention.

First of all, in accordance with the fourth embodiment of the present invention, the SMPS circuit for PDP includes first and third transformers T1, T2 and T3, first to fourth DC/DC converters 51, 54, 55 and 53, a clamp circuit 52 and a linear regulator unit 56.

At this time, the first DC/DC converter 51 and the clamp circuit 52 are connected to a secondary side of the first transformer T1, the third and fourth DC/DC converters 55 and 53 and the linear regulator unit 56 are connected to a secondary side of the second transformer T2, and the second DC/DC converter 54 is connected to a secondary side of the third transformer T3.

That is, the first DC/DC converter is connected to the secondary side of the first transformer T1 and outputs a sustain voltage $V_S$.

Further, the clamp circuit 52 is connected to the secondary side of the first transformer T1 and applied with a voltage supplied from the first transformer T1 to output an address voltage Va of a predetermined size.

The third DC/DC converter 55 is connected to the secondary side of the second transformer T2 and outputs a driving voltage D5.3V.

Further, the linear regulator unit 56 is connected to the secondary of the second transformer T2 and outputs the gate voltage Vg and the fourth DC/DC converter 53 is connected to the secondary side of the second transformer T2 and outputs a plurality of low voltages $V_M$.

Particularly, in the fourth embodiment of the present invention, the second DC/DC converter 54 is connected to a secondary side of the third transformer T3 and outputs a standby voltage STD_BY.

As described above, in accordance with the preferable embodiments of the present invention, the SMPS circuit for PDP is capable of reducing a space occupied by components by supplying the sustain voltage and the address voltage through one insulating transformer, thereby reducing a manufacturing cost as well as the total size and volume of the PDP power system.

Further, the SMPS circuit for PDP is capable of facilitating optimal voltage control of PDP power and improving power conversion efficiency and reliability by using the one insulating transformer especially for the sustain voltage and the address voltage.

Further, the SMPS circuit for PDP is capable of satisfying the power on sequence required in the PDP power system even when integrally designing the output stages for supplying the sustain voltage and the address voltage with one transformer.

As described above, although a few preferable embodiments of the present invention have been shown and described, it will be appreciated by those skilled in the art that substitutions, modifications and changes may be made in these embodiments without departing from the principles and spirit of the general inventive concept, the scope of which is defined in the appended claims and their equivalents.

What is claimed is:

1. An SMPS (Switching Mode Power Supply) circuit for PDP (Plasma Display Panel), comprising:
   first and second transformers inducing voltages supplied to primary sides to secondary sides;
   a plurality of DC/DC converters connected to the secondary sides of the first and second transformers and supplying voltages of different sizes;
   a clamp circuit connected to the secondary side of the first transformer and outputting an address voltage of a predetermined size by receiving a voltage supplied from the first transformer; and
   a linear regulator unit connected to the DC/DC converter for supplying a low voltage among the DC/DC converters connected to the secondary side of the first transformer and outputting a gate voltage of a predetermined size by receiving the low voltage supplied from the DC/DC converter, wherein the clamp circuit for supplying the address voltage includes:
first and second resistors dividing a sustain voltage among the voltages supplied from the DC/DC converters;
a first switching means provided with a gate connected to contacts of the first and second resistors and a drain connected to a second rectification unit connected to the second winding of the secondary side of the first transformer to output the address voltage through a source;
a third resistor provided with one end connected to the gate of the first switching means;
a first Zener diode provided with a cathode connected to the other end of the third resistor and an anode connected to the ground;
a second Zener diode provided with a cathode connected to the one end of the third resistor and an anode connected to the source of the first switching means;
fourth and fifth resistors dividing the address voltage;
a capacitor provided with one end connected to contacts of the fourth and fifth resistors and the other end connected to the cathode of the first Zener diode; and
a second switching means provided with a cathode connected to the other end of the capacitor, an anode connected to the ground, and a gate connected to the contacts of the fourth and fifth resistors.

2. An SMPS (Switching Mode Power Supply) circuit for PDP (Plasma Display Panel) comprising:
first and second transformers inducing voltages supplied to primary sides to secondary sides;
a plurality of DC/DC converters connected to the secondary sides of the first and second transformers and supplying voltages of different sizes;
a clamp circuit connected to the secondary side of the first transformer and outputting an address voltage of a predetermined size by receiving a voltage supplied from the first transformer; and
a linear regulator unit connected to the DC/DC converter for supplying a low voltage among the DC/DC converters connected to the secondary side of the first transformer and outputting a gate voltage of a predetermined size by receiving the low voltage supplied from the DC/DC converter,
wherein any one of the DC/DC converters includes the first transformer and a first rectification unit connected to a first winding of the secondary side of the first transformer and supplies a sustain voltage.

3. The SMPS circuit for PDP according to claim 2, wherein other one of the DC/DC converters is connected to the first transformer and a third rectification unit connected to a third winding of the secondary side of the first transformer and supplies a low voltage.

4. The SMPS circuit for PDP according to claim 2, wherein other one of the DC/DC converters is connected to the second transformer and a fourth rectification unit connected to a first winding of the secondary side of the second transformer and supplies a standby voltage.

5. The SMPS circuit for PDP according to claim 4, wherein the DC/DC converter for supplying the standby voltage is a flyback-converter.

6. The SMPS circuit for PDP according to claim 2, wherein other one of the DC/DC converters is connected to the second transformer and a fifth rectification unit connected to a second winding of the secondary side of the second transformer and supplies a driving voltage.

7. The SMPS circuit for PDP according to claim 6, wherein the DC/DC converter for supplying the driving power includes:

a sixth resistor provided with one end connected to the DC/DC converter for supplying the standby voltage;
a seventh resistor provided with one end connected to the other end of the sixth resistor and the other end applied with a switching voltage from the outside;
a third switching means provided with a gate connected to contacts of the sixth and seventh resistors and a source connected to the ground and controlled by the switching voltage; and
a fourth switching means provided with a gate connected to a drain of the third switching means and a drain connected to the sixth resistor to output the driving voltage through a source.

8. The SMPS circuit for PDP according to claim 2, wherein the DC/DC converter for supplying the sustain voltage is a half-bridge resonance type converter.

9. The SMPS circuit for PDP according to claim 2, wherein the DC/DC converter for supplying the low voltage is a buck-converter.

10. An SMPS circuit for PDP, comprising:
first and second transformers inducing voltages supplied to primary sides to secondary sides;
a plurality of DC/DC converters connected to the secondary sides of the first and second transformers and supplying voltages of different sizes;
a clamp circuit connected to the secondary side of the first transformer and outputting an address voltage of a predetermined size by receiving a voltage supplied from the first transformer; and
a linear regulator unit connected to the DC/DC converter for supplying a driving voltage of the DC/DC converters connected to the secondary side of the second transformer and outputting a gate voltage of a predetermined size by receiving the driving voltage supplied from the DC/DC converter,
wherein any one of the DC/DC converters is connected to the first transformer and a third rectification unit connected to a third winding of the secondary side of the first transformer and supplies a low voltage.

11. The SMPS circuit for PDP according to claim 10, wherein other one of the DC/DC converters is connected to the first transformer and a first rectification unit connected to a first winding of the secondary side of the first transformer and supplies a sustain voltage.

12. The SMPS circuit for PDP according to claim 10, wherein other one of the DC/DC converters is connected to the second transformer and a fifth rectification unit connected to a second winding of the secondary side of the second transformer and supplies a driving voltage.

13. The SMPS circuit for PDP according to claim 10, wherein the DC/DC converter for supplying the sustain voltage is a half-bridge resonance type converter.

14. The SMPS circuit for PDP according to claim 10, wherein the DC/DC converter for supplying the low voltage is a buck-converter.

15. The SMPS circuit for PDP according to claim 10, wherein the DC/DC converter for supplying the driving power includes:
a sixth resistor provided with one end connected to the DC/DC converter for supplying the standby voltage;
a seventh resistor provided with one end connected to the other end of the sixth resistor and the other end applied with a switching voltage from the outside;
a third switching means provided with a gate connected to contacts of the sixth and seventh resistors and a source connected to the ground and controlled by the switching voltage; and a fourth switching means provided with a gate connected to a drain of the third switching means and a drain connected to the sixth resistor to output the driving voltage through a source.

16. An SMPS circuit for PDP, comprising:
first and second transformers inducing voltages supplied to primary sides to secondary sides;
a plurality of DC/DC converters connected to the secondary sides of the first and second transformers and supplying voltages of different sizes;
a clamp circuit connected to the secondary side of the first transformer and outputting an address voltage of a predetermined size by receiving a voltage supplied from the first transformer; and
a linear regulator unit connected to the DC/DC converter for supplying a driving voltage of the DC/DC converters connected to the secondary side of the second transformer and outputting a gate voltage of a predetermined size by receiving the driving voltage supplied from the DC/DC converter,
wherein any one of the DC/DC converters is connected to the second transformer and a fourth rectification unit connected to a first winding of the secondary side of the second transformer and supplies a standby voltage.

17. The SMPS circuit for PDP according to claim 16, wherein the DC/DC converter for supplying the standby voltage is a flyback-converter.

18. An SMPS circuit for PDP provided with a plurality of DC/DC converters for supplying high sustain voltage and address voltage, a plurality of low voltages, a standby voltage, a driving voltage and a gate voltage, the circuit comprising:
first and second transformers inducing voltages supplied to primary sides to secondary sides;
a first DC/DC converter connected to the secondary side of the first transformer and outputting the sustain voltage;
a clamp circuit connected to the secondary side of the first transformer and outputting the address voltage of a predetermined size by receiving a voltage supplied from the first transformer;
a second DC/DC converter connected to the secondary side of the second transformer and outputting the standby voltage;
a third DC/DC converter connected to the secondary side of the second transformer and outputting the driving voltage;
a linear regulator unit outputting the gate voltage of a predetermined size by receiving the driving voltage supplied from the third DC/DC converter; and
a fourth DC/DC converter connected to the secondary side of the second transformer and outputting the plurality of low voltages.

19. An SMPS circuit for PDP provided with a plurality of DC/DC converters for supplying high sustain voltage and address voltage, a plurality of low voltages, a standby voltage, a driving voltage and a gate voltage, the circuit comprising:
first to third transformers inducing voltages supplied to primary sides to secondary sides;
a first DC/DC converter connected to the secondary side of the first transformer and outputting the sustain voltage;
a clamp circuit connected to the secondary side of the first transformer and outputting the address voltage of a predetermined size by receiving a voltage supplied from the first transformer;
a second DC/DC converter connected to a secondary side of the third transformer and outputting the standby voltage;
a third DC/DC converter connected to the secondary side of the second transformer and outputting the driving voltage;
a linear regulator unit outputting the gate voltage of a predetermined size by receiving the driving voltage supplied from the third DC/DC converter; and
a fourth DC/DC converter connected to the secondary side of the second transformer and outputting the plurality of voltages,
wherein the clamp circuit for supplying the address voltage includes:
first and second resistors dividing a sustain voltage among the voltages supplied from the DC/DC converters;
a first switching means provided with a gate connected to contacts of the first and second resistors and a drain connected to a second rectification unit connected to the second winding of the secondary side of the first transformer to output the address voltage through a source;
a third resistor provided with one end connected to the gate of the first switching means;
a first Zener diode provided with a cathode connected to the other end of the third resistor and an anode connected to the ground;
a second Zener diode provided with a cathode connected to the one end of the third resistor and an anode connected to the source of the first switching means;
fourth and fifth resistors dividing the address voltage;
a capacitor provided with one end connected to contacts of the fourth and fifth resistors and the other end connected to the cathode of the first Zener diode; and
a second switching means provided with a cathode connected to the other end of the capacitor, an anode connected to the ground and a gate connected to the contacts of the fourth and fifth resistors.

* * * * *